(12) United States Patent
Yamamoto et al.

(10) Patent No.: US 10,901,923 B1
(45) Date of Patent: Jan. 26, 2021

(54) ELECTRONIC DEVICE, ELECTRONIC DEVICE SYSTEM AND MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Minoru Yamamoto, Kawasaki Kanagawa (JP); Michihiko Umeda, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/808,462

(22) Filed: Mar. 4, 2020

(30) Foreign Application Priority Data

Sep. 12, 2019 (JP) .................................. 2019-166454

(51) Int. Cl.
| | |
|---|---|
| *G11B 20/10* | (2006.01) |
| *G11B 33/14* | (2006.01) |
| *G06F 13/16* | (2006.01) |
| *G11B 5/33* | (2006.01) |
| *G06F 13/42* | (2006.01) |
| *G11B 5/00* | (2006.01) |

(52) U.S. Cl.
CPC ...... *G06F 13/1668* (2013.01); *G06F 13/4282* (2013.01); *G11B 5/33* (2013.01); *G11B 33/148* (2013.01); *G06F 2213/0028* (2013.01); *G06F 2213/0036* (2013.01); *G11B 2005/001* (2013.01)

(58) Field of Classification Search
CPC ...... G06F 3/0623; G06F 3/0634; G06F 3/067; G06F 3/0689; G06F 13/107; G06F 9/45504; G06F 13/4282; G11B 27/36; G11B 15/087; G11B 20/10009; G11B 20/10; G11B 33/14; G11B 33/1406; G11B 33/1446
USPC ........................ 360/25, 27, 31, 39, 53, 97.12
See application file for complete search history.

(56) References Cited

U.S. PATENT DOCUMENTS

| | | | |
|---|---|---|---|
| 7,043,578 B2 | 5/2006 | Hufferd | |
| 7,920,569 B1* | 4/2011 | Kasturi | H04L 69/18 370/392 |
| 8,352,663 B2 | 1/2013 | Hirayama | |
| 8,625,635 B2 | 1/2014 | Baptist et al. | |
| 8,819,663 B2* | 8/2014 | Goel | H04L 41/082 717/168 |
| 9,904,486 B2* | 2/2018 | El-Batal | G06F 3/0689 |
| 10,023,476 B2* | 7/2018 | Takeda | C02F 1/283 |
| 10,185,670 B2* | 1/2019 | Litichever | G06F 9/45504 |
| 2012/0151101 A1* | 6/2012 | Matsuo | G06F 3/0659 710/18 |

* cited by examiner

*Primary Examiner* — Nabil Z Hindi
(74) *Attorney, Agent, or Firm* — White & Case LLP

(57) ABSTRACT

According to one embodiment, an electronic device includes an interface, a setting unit, and a controller. The interface is operable to perform communication in accordance with a protocol. The setting unit is configured to set one of a plurality of items indicating a state of the electronic device. The controller is configured to, when a command is received via the interface, obtain the state of the item set in the setting unit, and when a response to the command is transmitted, include state information indicating the state of the set item in a header portion of the response defined in a communication standard of the protocol.

10 Claims, 8 Drawing Sheets

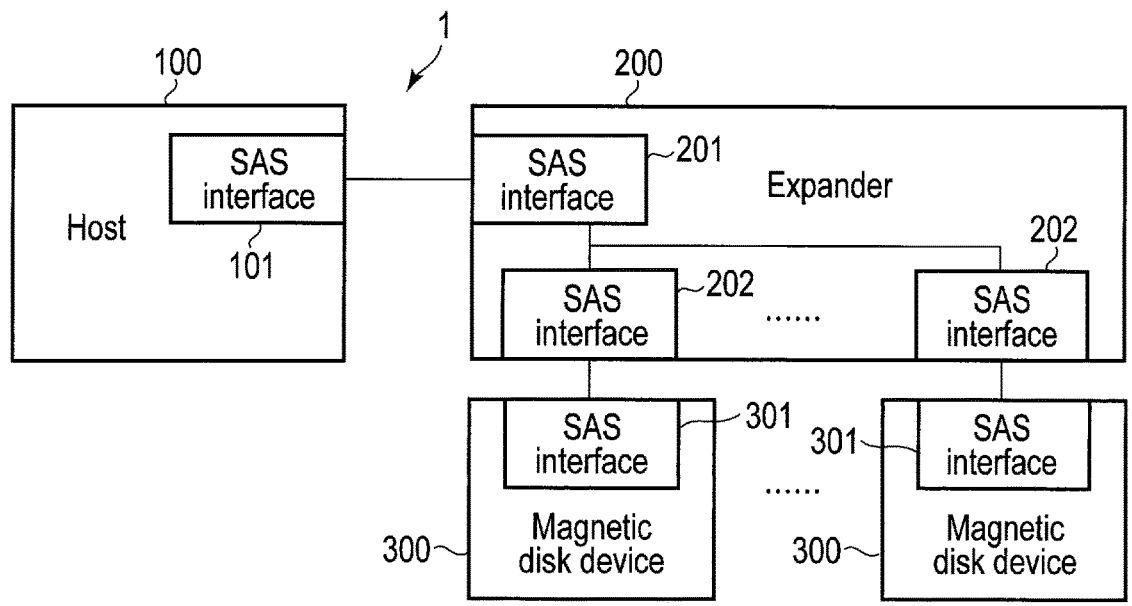
F I G. 1
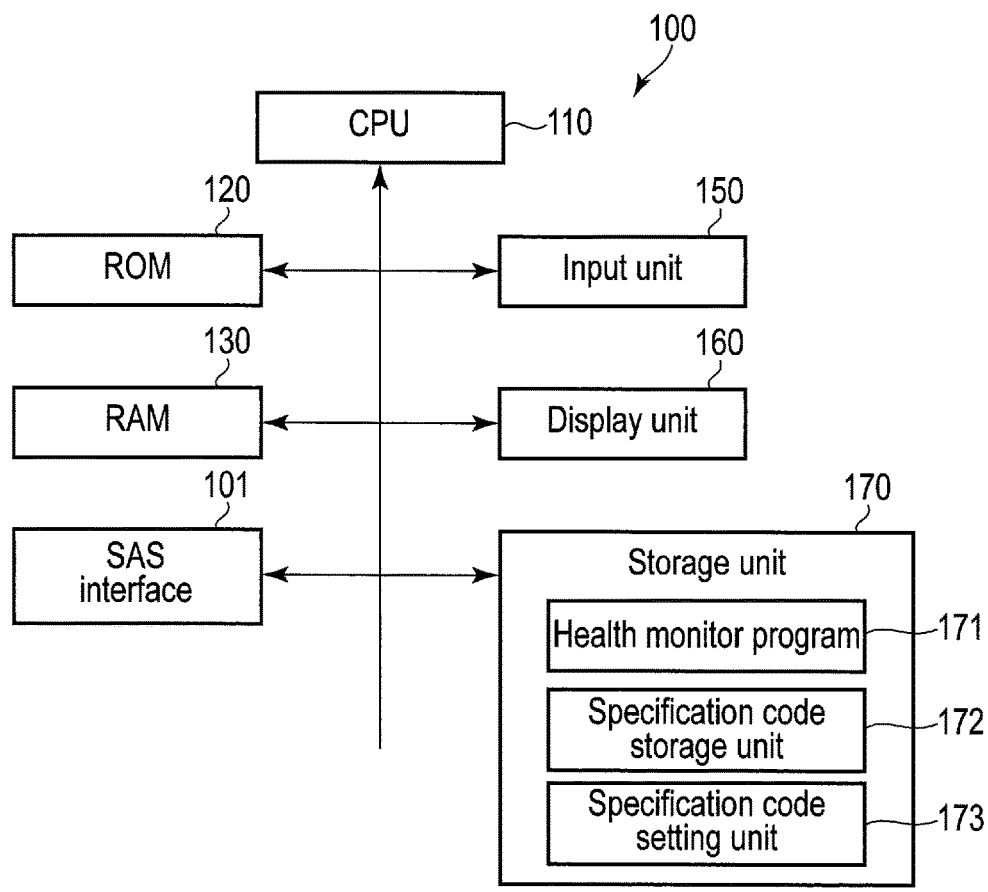
F I G. 2

T10

| Bytes\Bit | 7 | 6 | 5 | 4 | 3 | 2 | 1 | 0 |
|---|---|---|---|---|---|---|---|---|
| 0 | colspan=8 FRAME TYPE |
| 1 ... 3 | (MSB) | colspan=6 HASHED DESTNATION SAS ADDRESS | (LSB) |
| 4 | colspan=8 Reserved |
| 5 ... 7 | (MSB) | colspan=6 HASHED SOURCE SAS ADDRESS | (LSB) |
| 8 | colspan=8 Reserved |
| 9 | colspan=8 Reserved |
| 10 | colspan=3 Reserved | colspan=2 TLR CONTROL | RETRY DATA FRAMES | RETRANSMIT | CHANGING DATA POINTER |
| 11 | colspan=6 Reserved | colspan=2 NUMBER OF FILL BYTES |
| 12 | colspan=8 Reserved |
| 13 ... 15 | colspan=8 Reserved |
| 16 17 | (MSB) | colspan=6 T11 INITIATOR PORT TRANSFER TAG | (LSB) |
| 18 19 | (MSB) | colspan=6 TARGET PORT TRANSFER TAG | (LSB) |
| 20 ... 23 | (MSB) | colspan=6 DATA OFFSET | (LSB) |
| 24 ... m | (MSB) | colspan=6 INFORMATION UNIT | (LSB) |
|  | colspan=8 Fill bytes, if needed |
| n-3 ... n | (MSB) | colspan=6 CRC | (LSB) |

| TPTT | 7 | 6 | 5 | 4 | 3 | 2 | 1 | 0 |
|---|---|---|---|---|---|---|---|---|
| High-order byte | Specification code | | | | | | | |
| Low-order byte | | | | | | | | |

F I G. 5

T20

| Specification code | Report contents |
|---|---|
| 01 | Temperature |
| 02 | Voltage |
| 03 | He leak monitor information |
| 04 | POWER ON time |
| 05 | Connect IF transfer rate information |
| 06 | SMART Attribute (BER) |
| 07 | SMART Attribute (Peak Retry Step) |

F I G. 6

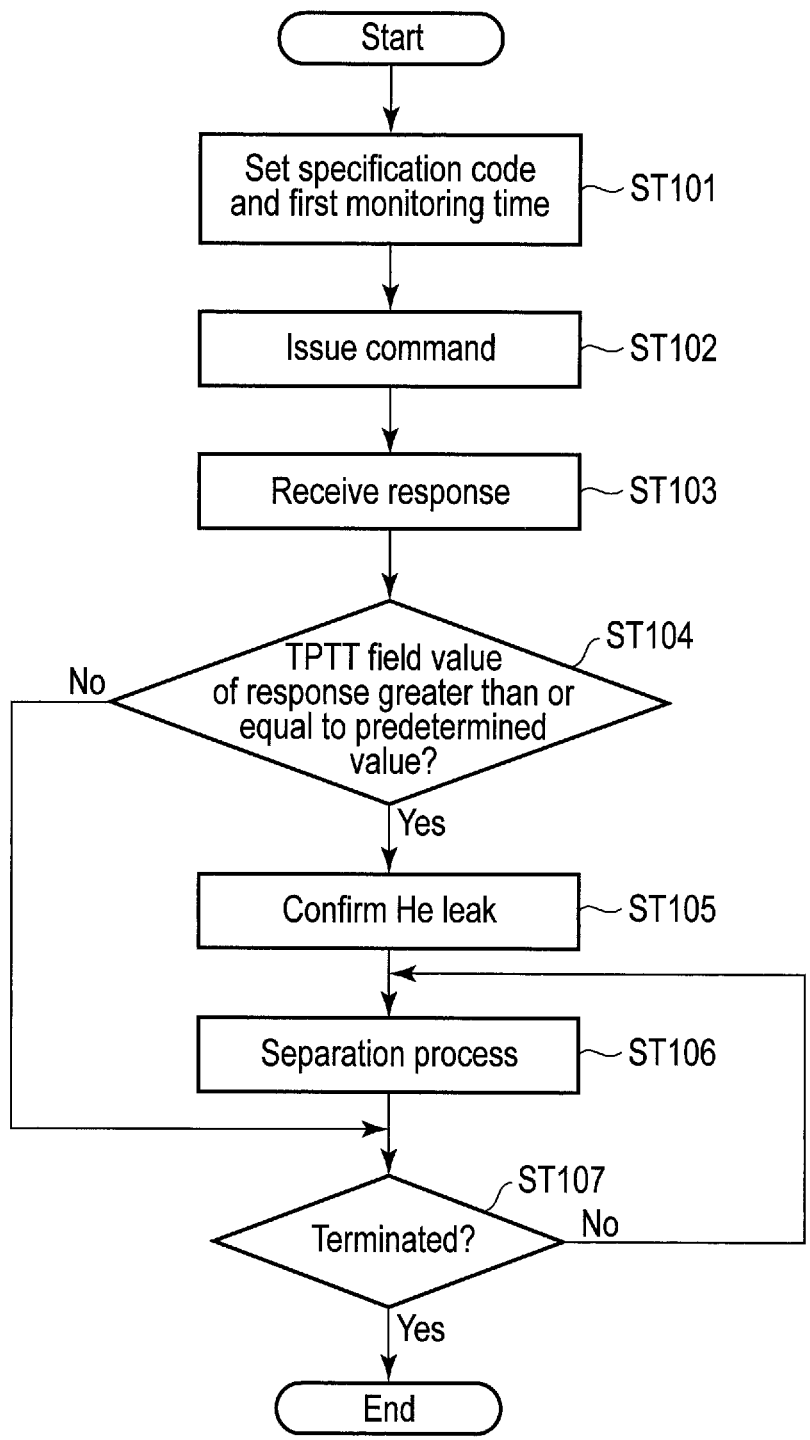
F I G. 7

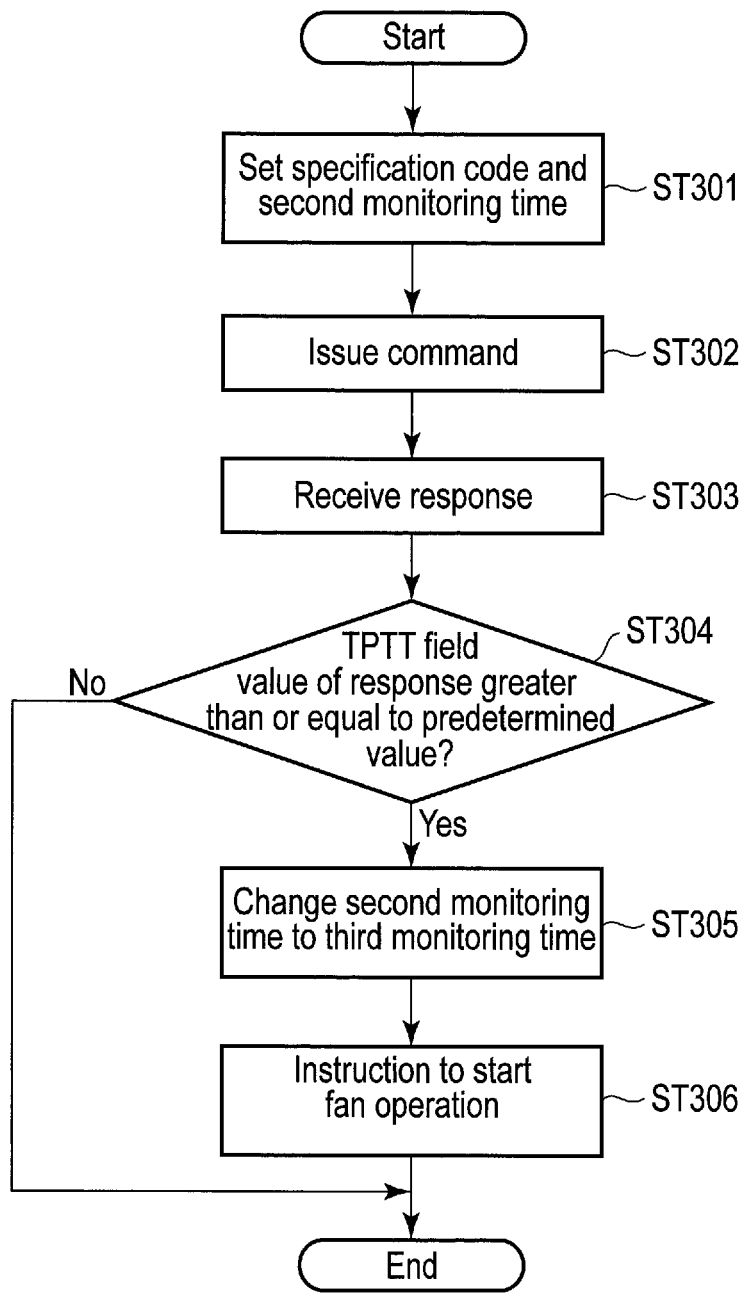
F I G. 9

ELECTRONIC DEVICE, ELECTRONIC DEVICE SYSTEM AND MAGNETIC DISK DEVICE

CROSS-REFERENCE TO RELATED APPLICATIONS

This application is based upon and claims the benefit of priority from Japanese Patent Application No. 2019-166454, filed Sep. 12, 2019, the entire contents of which are incorporated herein by reference.

FIELD

Embodiments described herein relate generally to an electronic device, an electronic device system and a magnetic disk device.

BACKGROUND

In an electronic device system, a host device and a storage device are connected to each other and used. In this electronic device system, the host device transmits a predetermined command to the storage device to confirm the state of the storage device, and obtains and confirms the current state of the storage device such as the temperature of the storage device and the transfer rate of an interface based on a response to the command. At this time, when a read/write command is executed as normal I/O handling from the host device, the I/O process of read/write is stopped on the interface, and the process of the issued predetermined command is executed. In this period, the I/O handling of read/write is delayed from the standpoint of the host device. When the host device issues a plurality of commands to obtain a plurality of information items regarding the state of the storage device, or when the interval for obtaining the state of the storage device is shortened, the I/O process is further delayed.

Embodiments described herein aim to provide an electronic device, an electronic device system and a magnetic disk device such that an I/O process is not affected when the state is known.

BRIEF DESCRIPTION OF THE DRAWINGS

FIG. 1 shows an example of the configuration of an electronic device system according to an embodiment.

FIG. 2 shows an example of the general configuration of a host according to the embodiment.

FIG. 4 shows an example of the header portion of a response according to the embodiment.

FIG. 5 shows an example of the details of a TPTT field according to the embodiment.

FIG. 6 shows an example of a specification code according to the embodiment.

FIG. 7 is a flowchart showing an example of a process performed by the host according to the embodiment.

FIG. 9 is a flowchart showing an example of a process performed by the host according to the embodiment.

DETAILED DESCRIPTION

Figure 3:
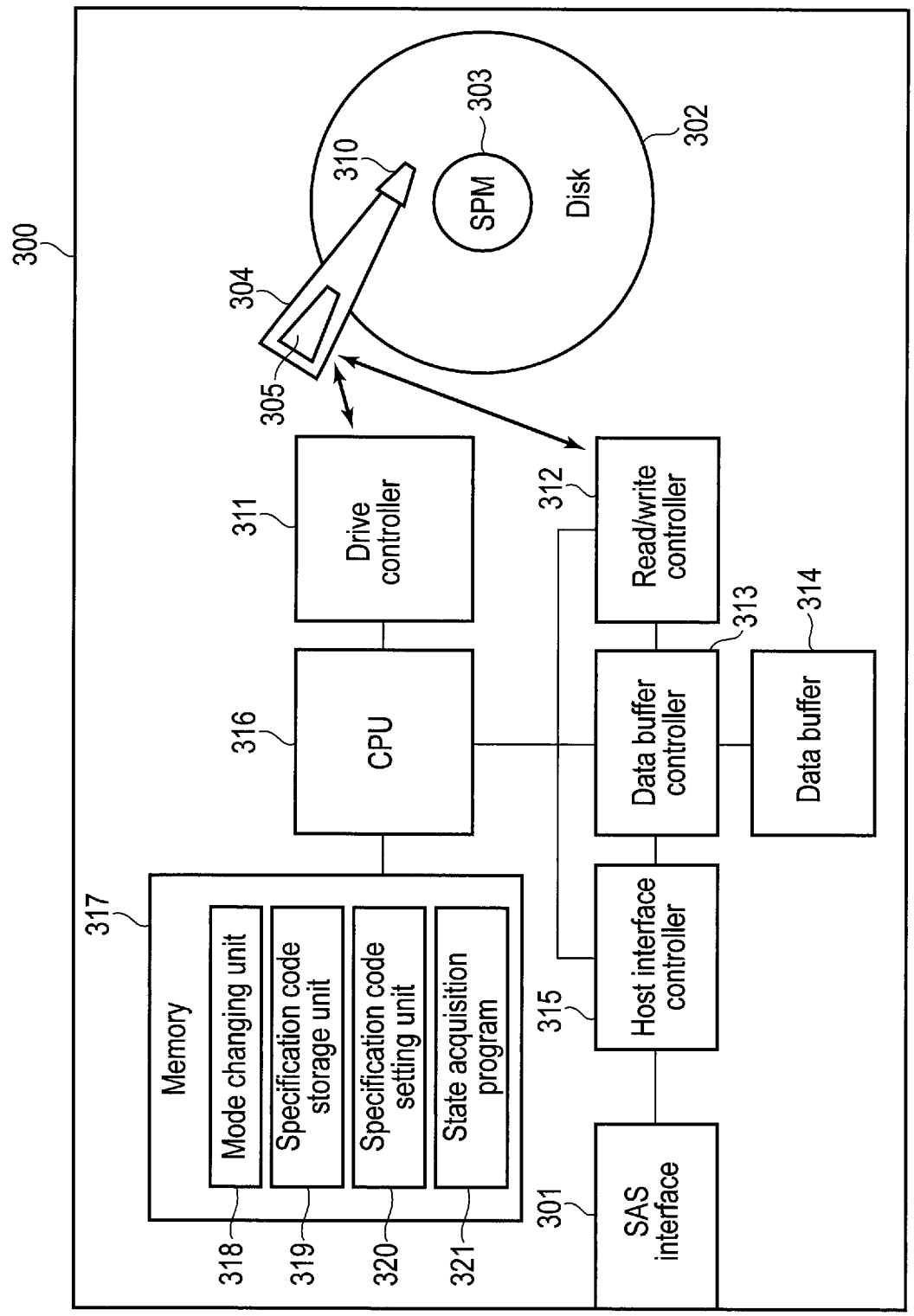
FIG. 3 shows an example of the general configuration of a magnetic disk device according to the embodiment.

In general, according to one embodiment, an electronic device includes an interface, a setting unit, and a controller. The interface is operable to perform communication in accordance with a protocol. The setting unit is configured to set one of a plurality of items indicating a state of the electronic device. The controller is configured to, when a command is received via the interface, obtain the state of the item set in the setting unit, and when a response to the command is transmitted, include state information indicating the state of the set item in a header portion of the response defined in a communication standard of the protocol.

Embodiments will be described hereinafter with reference to the accompanying drawings. The disclosure is merely an example and is not limited by contents described in the embodiments below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numbers and their detailed descriptions may be omitted unless necessary.

FIG. 1 shows an example of the configuration of an electronic device system 1 according to the present embodiment.

As shown in FIG. 1, the electronic device system 1 includes a host (second electronic device) 100 which is an electronic device, an expander 200 and a plurality of magnetic disk devices (first electronic devices) 300. The host 100, the expander 200 and the magnetic disk devices 300 are connected by predetermined interfaces. The present embodiment assumes a case where each predetermined interface is a Serial Attached SCSI (SAS). However, each predetermined interface is not limited to this example. The present embodiment assumes a case where the host 100 is connected to each magnetic disk device 300 via the expander 200. However, the host 100 may be directly connected to each magnetic disk device 300.

The host 100 includes a SAS interface 101. The expander 200 includes SAS interfaces 201 and 202. Each magnetic disk device 300 includes a SAS interface 301. The host 100 and the expander 200 are connected to each other by SAS interface 101 and SAS interface 201. The expander 200 and each magnetic disk device 300 are connected to each other by SAS interface 202 and SAS interface 301. One of SAS interfaces 202 of the expander 200 may be connected to another expander 200. As described above, as the host 100 is connected to the magnetic disk devices 300 by the SAS interfaces via the expander 200, the host 100 is capable of performing data communication in accordance with a Serial SCSI Protocol (SSP) communication standard.

FIG. 2 shows an example of the general configuration of the host 100.

The host 100 is, for example, an information processing device such as a computer device, and manages a plurality of magnetic disk devices 300. As shown in FIG. 2, the host 100 includes a CPU (second controller) 110, a ROM 120, a RAM 130, SAS interface 101, an input unit 150, a display unit 160 and a storage unit 170. CPU 110 is connected to each of the ROM 120, the RAM 130, SAS interface 101, the input unit 150, the display unit 160 and the storage unit 170. The storage unit 170 includes a health monitor program 171, a specification code storage unit 172 and a specification code setting unit (setting unit) 173.

CPU 110 is a central processing unit, and runs the programs stored in the storage unit 170, using the ROM 120, the RAM 130, etc. The ROM 120 is a nonvolatile memory. For example, a program which is the base to operate the host 100 is stored in the ROM 120. The RAM 130 is, for example, a DRAM, and is used as a work area when CPU 110 runs a program, etc. SAS interface 101 is connected to SAS interface 201 of the expander 200. The input unit 150 is, for example, a keyboard or a mouse. An instruction is input to the host 100 when a user of the host 100 operates the input unit 150. The display unit 160 is, for example, a display, and displays information to a user.

The storage unit 170 is, for example, a hard disk drive. Various programs and data are stored in the storage unit 170. The health monitor program 171 is a program which monitors the state of each magnetic disk device 300 connected to the host 100. The details of the program are described later with reference to FIG. 7 and FIG. 9. The health monitor function executed by running the health monitor program 171 can be turned on and off when, for example, a user operates the input unit 150. The present embodiment assumes a case where the health monitor function is turned on. In specification code storage unit 172, specification codes corresponding to a plurality of items indicating the state of the magnetic disk devices 300 are stored. The details of the specification codes stored in specification code storage unit 172 are described later with reference to FIG. 6. One of the specification codes stored in specification code storage unit 172 is set in specification code setting unit 173.

The expander 200 is a relay device between the host 100 and each magnetic disk device 300. The expander 200 comprises SAS interfaces 201 and 202. SAS interface 201 is connected to the host 100. SAS interfaces 202 are connected to a plurality of magnetic disk devices 300, respectively. In this configuration, a command from the host 100 is transmitted to a specified magnetic disk device 300 via the expander 200. A response based on the command is transmitted from the magnetic disk device 300 to the host 100 via the expander 200.

FIG. 3 shows an example of the general configuration of each magnetic disk device 300.

As shown in FIG. 3, the magnetic disk device 300 is, for example, a hard disk drive (HDD). The magnetic disk device 300 comprises a magnetic disk 302, a spindle motor (SPM) 303, an actuator 304, a voice coil motor (VCM) 305, a magnetic head 310, a drive controller 311, a read/write controller 312, a data buffer controller 313, a data buffer 314, a host interface controller 315, a CPU (a controller, a first controller) 316, a memory 317 and SAS interface 301. The magnetic disk device 1 is connectable to the expander 200 by SAS interface 301. The read/write controller 312, the host interface controller 315 and CPU 316 may be incorporated into a single-chip integrated circuit. For example, the magnetic disk 302, the SPM 303, the actuator 304, the VCM 305 and the magnetic head 310 are provided in a predetermined hermetic housing. In the present embodiment, the housing is filled with helium (He). By filling the housing with He, the magnetic head 310 can be flown by a predetermined amount from the recording surface of the magnetic disk 301.

The magnetic head 310 comprises a write head (a recording head: a writer), a read head (a reproducing head: a reader), and a spin torque oscillator (STO), which is a high-frequency oscillator. A plurality of magnetic heads 310 are provided in accordance with the number of magnetic disks 302.

The magnetic disk 302 comprises, for example, a substrate formed in the shape of a circular disk and formed of a nonmagnetic material. On each surface of the substrate, a soft magnetic layer formed of a material exhibiting a soft magnetic property is stacked as an underlayer. On the upper layer portion of the soft magnetic layer, a magnetic recording layer having magnetic anisotropy in a direction perpendicular to the disk surface is stacked. On the upper layer portion of the magnetic recording layer, a protection film layer is stacked.

The magnetic disk 302 is secured to the spindle motor (SPM) 303 and is rotated at a predetermined rate by the SPM 303. The number of magnetic disks 302 is not limited to one. A plurality of magnetic disks 302 may be provided in the SPM 303. The SPM 303 is driven by the drive current (or drive voltage) supplied from the drive controller 311. A data pattern is recorded in and reproduced from the magnetic disk 302 by the magnetic head 310.

The actuator 304 is rotatably provided. The magnetic head 310 is supported in the distal end portion of the actuator 304. By rotating the actuator 304 with the voice coil motor (VCM) 305, the magnetic head 310 is caused to move onto a desired track of the magnetic disk 302, and thus, the position of the magnetic head 310 is determined. The VCM 305 is driven by the drive current (or drive voltage) supplied from the drive controller 311.

The read/write controller 312 includes a signal processing circuit which processes signals related to read/write. The signal processing circuit comprises a read channel which performs the signal process of read data and a write channel which performs the signal process of write data. The read/write controller 312 amplifies a read signal output from the magnetic head (read head) 310, converts the read signal into digital data, demodulates read data from the digital data and transmits the data to the data buffer controller 313. The read/write controller 312 encodes write data transmitted from the data buffer controller 313 and supplies a write signal (write current) based on the encoded write data to the magnetic head (write head) 310.

The data buffer controller 313 temporarily retains read data transferred from the read/write controller 312 in the data buffer 314, and subsequently, transfers the data to the host interface controller 315. The data buffer controller 313 temporarily retains write data transferred from the host interface controller 315 in the data buffer 314, and subsequently, transfers the data to the read/write controller 312.

The host interface controller 315 controls data writing to the magnetic disk 302 and data reading from the magnetic disk 302 via the magnetic head 310, the read/write controller 312, the data buffer controller 313 and the data buffer 314. The host interface controller 315 performs the transfer control of read data and write data between the magnetic disk device 300 and the host 100 via the expander 200. The host interface controller 315 receives a command (a write command, a read command, etc.,) transferred from the host 100 and transmits the received command to CPU 316.

CPU 316 is the main controller of the magnetic disk device 1, and performs the control of read/write operation and servo control necessary for the determination of the position of the magnetic head 10. When CPU 316 receives a command from the host interface controller 315, CPU 316 performs the control of executing the command and transmitting a response including the result of the execution of the command to the host 100.

The drive controller 311 controls the driving of the SPM 303 and the VCM 305 in accordance with the control of CPU 316. By driving the VCM 305, the magnetic head 310 is caused to be located in the target track on the magnetic disk 302.

The memory 317 includes a volatile memory and a nonvolatile memory. For example, the memory 317 includes a buffer memory configured by a DRAM, and a flash memory. Programs and parameters necessary for the process of CPU 316 are stored in the memory 317. Further, the memory 317 comprises a mode changing unit 318, a specification code storage unit 319, a specification code setting unit (setting unit) 320 and a state acquisition program 321. The mode changing unit 318 changes the specification code set in specification code setting unit 320 based on the instruction of the host 100. In specification code storage unit 319, specification codes corresponding to a plurality of items indicating the state of the magnetic disk device 300 are stored. One of the specification codes stored in the specification code storage unit is set in specification code setting unit 320. The state acquisition program 321 is a program which obtains the state of the magnetic disk device 300 in accordance with the specification code set in specification code setting unit 320 when a command is received.

In the SSP communication standard for performing communication in the electronic devices (the host 100, the expander 200 and each magnetic disk device 300) connected by the SAS interfaces, when a response to a command received from the host 100 is transmitted from the magnetic disk device 300 to the host 100, the response includes predetermined information in the header portion. FIG. 4 shows an example of the header portion of a response. For example, in the case of an SSP FRAME HEADER FORMAT, the header portion is defined in SPL-5 Ver07.

As shown in FIG. 4, the header portion T10 includes frame 0 to frame n, and each frame is formed by 1 byte (8 bits). The header portion T10 is defined so as to include each type of information depending on the frame using the 8 bits of the frame. In the present embodiment, information indicating the state of the magnetic disk device 300 can be included in the TARGET PORT TRANSPORT TAG (TPTT) field T11 of frames 18 and 19, not in the Reserved fields included in the header portion T10.

FIG. 5 shows an example of the details of the TPTT field T11.

As shown in FIG. 5, the TPTT field T11 is formed by the 8 bits of a high-order byte and the 8 bits of a low-order byte, and is configured to include a specification code using the 4 bits of the high-order byte. In the present embodiment, the state (state information) of the magnetic disk device 300 specified by a specification code can be included, using the bits other than the 4 bits of the high-order byte. Which state is indicated by which bit state is defined for each specification code in advance. The bit numbers indicating a specification code or the bit numbers indicating the state of the magnetic disk device can be arbitrarily determined.

FIG. 6 shows an example of a specification code T20.

A plurality of specification codes specified in the TPTT field T11 are stored in the specification code T20. The specification code T20 is stored in specification code storage unit 172 of the host 100 and specification code storage unit 319 of the magnetic disk device 300 with the same contents. Further, the same contents are stored regarding the specification code set in specification code setting unit 173 of the host 100 and specification code setting unit 320 of the magnetic disk device 300. When the specification code set in specification code setting unit 173 of the host 100 is changed, specification code setting unit 320 of the magnetic disk device 300 is changed by the mode changing unit 171 of the magnetic disk device 300 in accordance with the change to the host 100.

As shown in FIG. 6, specification code 01 to specification code 07 are defined in the specification code T20. A temperature (for example, the temperature of the hard disk drive in the magnetic disk device 300), voltage (for example, the voltage applied to the magnetic head at the time of reading/writing in a predetermined track), helium (He) leak monitor information (the leak state of helium in the device), POWER ON time (for example, the accumulated activation time of the magnetic disk device 300), Connected IF transfer rate information, SMART Attribute (Bit Error Rate) and SMART Attribute (Peak Retry Step) are associated with specification code 01 to specification code 07, respectively.

When one of the specification codes is set in specification code setting units 173 and 320, and a command is transmitted from the host 100 to the magnetic disk device 300, a response including information indicating the state of the magnetic disk device 30 specified by the specification code in the TPTT field T11 of the header portion is transmitted from the magnetic disk device 300 to the host 100. CPU 110 of the host 100 is capable of performing the following process in accordance with the state of the magnetic disk device 300 obtained from the TPTT field T11 in this way.

When a temperature is specified (specification code 01), CPU 110 is capable of controlling the fan (not shown) of the magnetic disk device 300 in accordance with the temperature obtained from the TPTT field T11. For example, when the temperature is higher than a predetermined temperature, CPU 110 is capable of transmitting an instruction to drive the fan to the magnetic disk device 300.

When voltage is specified (specification code 02), for example, CPU 110 is capable of obtaining voltage in a predetermined track supplied by the magnetic disk device 300 to the magnetic head 310 at the time of predetermined reading or writing from the TPTT field T11. CPU 110 is capable of predicting the failure of the magnetic disk device 300 in accordance with the obtained voltage.

When He leak monitor information is specified (specification code 03), CPU 110 is capable of determining whether or not the magnetic disk device 300 should be replaced in accordance with the He leak state obtained from the TPTT field T11. When the magnetic disk device 300 leaks a predetermined amount of He, the flying amount of the magnetic head 310 for the magnetic disk 302 cannot be assured. Thus, data cannot be read or written. Therefore, the magnetic disk device 300 needs to be replaced. Under these circumstances, CPU 110 performs a process for separating the magnetic disk device 300 from the electronic device system 1.

When a POWER ON time is specified (specification code 04), CPU 110 determines whether or not the magnetic disk device 300 should be separated in accordance with the time obtained from the TPTT field T11. When the accumulated time of POWER ON is long, the possibility of the failure of the magnetic disk device 300 is increased. Thus, CPU 110 performs a process for separating the magnetic disk device 300 from the electronic device system 1.

When Connected IF transfer rate information is specified (specification code 05), for example, CPU 110 performs a process for disconnecting the expander 200 from the magnetic disk device 300 and connects them to each other again in accordance with the transfer rate obtained from the TPTT field T11. In this way, the improvement of the transfer rate of the magnetic disk device 300 is expected.

When a SMART Attribute (Bit Error Rate) and a SMART Attribute (Peak Retry Step) are specified (specification codes 06 and 07), CPU 110 detects the degradation of the magnetic head 310 in accordance with the value obtained from the TPTT field T11. In this way, CPU 110 is capable of predicting the failure of the magnetic disk device 300 comprising the magnetic head 310.

The specification codes stored in specification code storage unit 172 and 319 are not limited to the above examples. For example, a specification code which can specify a physical cylinder-head-sector (CHS) can be stored in specification code storage units 172 and 319. When this physical CHS is specified, for example, CPU 110 is capable of obtaining the location information of a sector in which a read error occurs obtained from the TPTT field T11. In this configuration, CPU 110 is capable of detecting the degradation of the magnetic head 310 by the location and range, and predicting the failure of the magnetic disk device 300. For example, a specification code which can specify debug/inspection information may be stored in specification code storage units 172 and 319. When this debug/inspection information is specified as a specification code, CPU 110 is capable of confirming the operation mode of the magnetic disk device 300 in accordance with the information obtained from the TPTT field T11. The operation mode which can be confirmed in this way is, for example, when the temperature of the magnetic disk device 300 is high, an operation mode for delaying the seek operation of the magnetic head 310 or an operation mode for reading data again to confirm whether or not the data has been accurately written after data write.

Now, this specification explains an effect when a specification code is set in specification code setting units 173 and 320. This specification explains a case where He leak monitor information (specification code 03) is set in specification code setting units 173 and 320 with reference to FIG. 7 and FIG. 8, and explains a case where a temperature (specification code 01) is set in specification code setting units 173 and 320 with reference to FIG. 9 and FIG. 10. In the following explanation, the state information (He leak information or a temperature) of the magnetic disk device 300 is not included in all the responses to all the commands. Instead, a monitoring time is set, and the state information of the magnetic disk device 300 is obtained based on each monitoring time.

Figure 8:
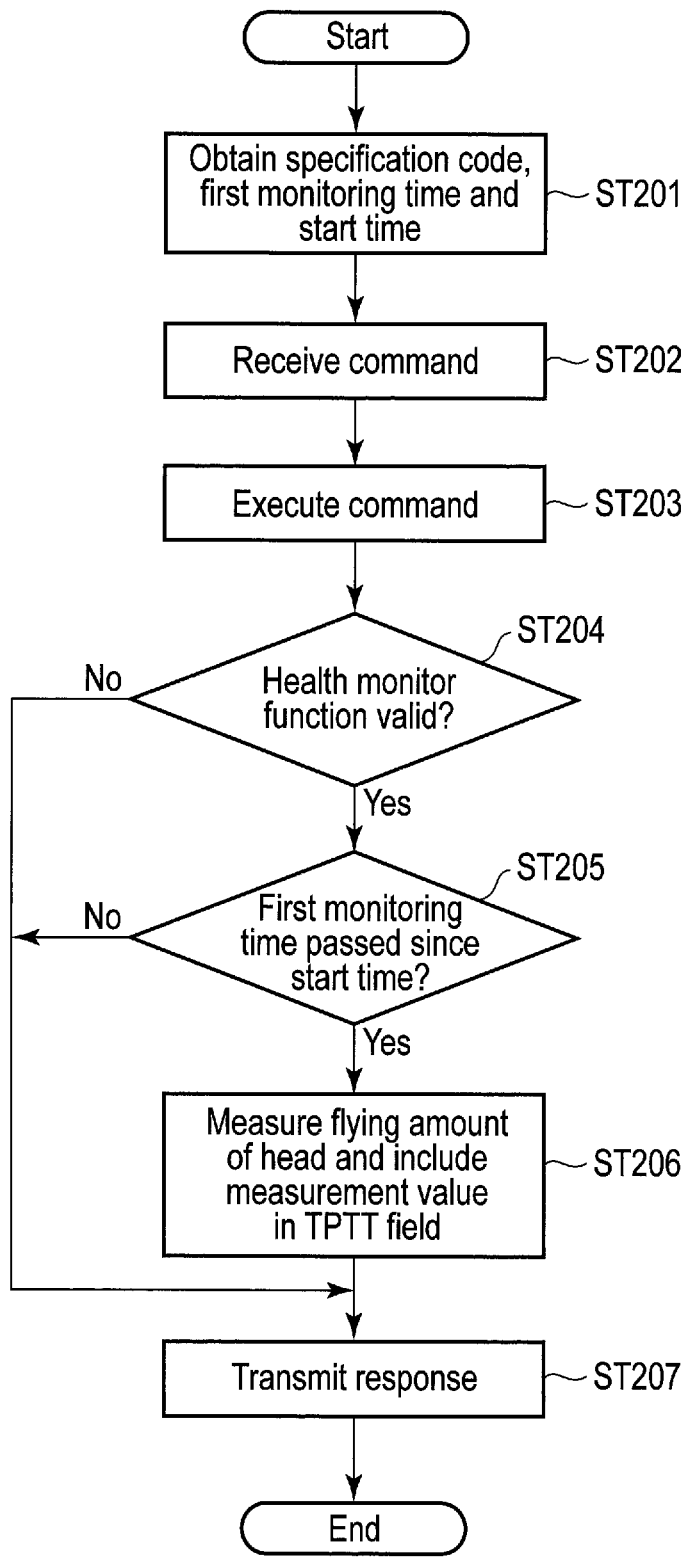
FIG. 8 is a flowchart showing an example of a process performed by the magnetic disk device according to the embodiment.

FIG. 7 and FIG. 8 show processes when He leak monitor information (specification code 03) is set in specification code setting units 173 and 320. FIG. 7 is a flowchart showing an example of a process performed by the host 100. FIG. 8 is a flowchart showing an example of a process performed by the magnetic disk device 300. The process of FIG. 7 is realized when CPU 110 reads and runs the health monitor program 171. The process of FIG. 8 is realized when CPU 316 reads and runs the state acquisition program 321.

The process of the host 100 is explained.

As shown in FIG. 7, CPU 110 firstly sets a specification code and a first monitoring time (ST101). For example, a user operates the input unit 150 to perform this setting. The user selects a specification code from the specification codes stored in specification code storage unit 172, and sets the specification code in specification code setting unit 173. Here, the user sets He leak monitor information (specification code 03) in specification code setting unit 173, and sets the first monitoring time (for example, 10 minutes) in specification code setting unit 173 as the monitoring time. The specification code and the first monitoring time set in this way are transmitted to the magnetic disk device 300 via the expander 200. When the information is received in the magnetic disk device 300, the He leak monitor information (specification code 03) and the first monitoring time are set in specification code setting unit 320 by the mode changing unit 318.

Subsequently, CPU 110 issues a command (ST102). Thus, the command is transmitted to the magnetic disk device 300 via the expander 200. CPU 110 receives a response based on the issued command from the magnetic disk device 300 (ST103).

Subsequently, CPU 110 determines whether or not the TPTT field value of the TPTT field T11 of the response is greater than or equal to a predetermined value (ST104). Here, the predetermined value is a value set in advance and indicating a state where a large amount of He is leaked. More specifically, the predetermined value is a value indicating a state where the read/write function of the magnetic disk device 300 cannot be performed. When CPU 110 determines that the TPTT field value is greater than or equal to the predetermined value (ST104: YES), CPU 110 confirms an He leak (ST105). When the He leak is greater than or equal to a predetermined value, since the head number of the magnetic head 310 is included as described later, CPU 110 performs a separation process for separating the magnetic disk device 300 including the magnetic head 310 from the electronic device system 1 (ST106). When an He leak is greater than or equal to the predetermined value, it cannot be recovered. Thus, the magnetic disk device 300 in this state needs to be separated from the electronic device system 1. To perform this separation process, the host 100 needs to save the data stored in the magnetic disk device 300 in advance.

When the separation process is performed (ST106), or when CPU 110 determines that the TPTT field value is not greater than or equal to the predetermined value in step ST104 (ST104: NO), CPU 110 determines whether or not the process should be terminated (ST107). When CPU 110 determines that the process should not be terminated (ST107: NO), the process returns to step ST106, and the separation process is continued. When CPU 110 determines that the process should be terminated (ST107: YES), the process is terminated. Until the setting of the specification code and the first monitoring time is changed next, the process of step ST102 to the process of step ST107 are repeated every time a command is received.

Now, this specification explains the process of the magnetic disk device 300.

As shown in FIG. 8, CPU 316 obtains a specification code, the first monitoring time and the start time (ST201). Here, the specification code is He leak monitor information (specification code 03). The start time is the time point at which the specification code and the first monitoring time are obtained from the host 100 and set in specification code setting unit 320.

When CPU 316 receives a command from the host 100 via the expander 200 (ST202), CPU 316 executes the command (ST203). Subsequently, CPU 316 determines whether or not the health monitor function is valid (ST204). In the present embodiment, the health monitor function is turned on. When CPU 316 determines that the health monitor function is turned on (ST204: YES), CPU 316 determines whether or not the first monitoring time has passed since the start time (ST205). When CPU 316 determines that the first monitoring time has passed (ST205: YES), CPU 316 measures the flying amount of the magnetic head 310 in accordance with the specification code set in specification code setting unit 320, sets the measurement value so as to be the bit number defined in advance and includes the measurement value in the TPTT field T11 (ST206). CPU 316 transmits a response (ST207). More specifically, CPU 316 transmits a response including leak monitor information in the TPTT field T11 to the host 100, and terminates the process. For example, information indicating the specification code and the measurement value is included in the high-order byte of the TPTT field T11. When the flying amount is greater than or equal to a predetermined value, the head number of the magnetic head 310 is included in the low-order byte.

When CPU 316 determines that the health monitor function is invalid in step ST204 (ST204: NO), or when CPU 316 determines that the first monitoring time has not passed since the start time in step ST205 (ST205: NO), CPU 316 transmits a response and terminates the process (ST207). In the TPTT field T11 of the response, leak monitor information is not included. Until the setting of the specification code and the first monitoring time is changed next, the process of step ST202 to the process of step ST207 are repeated every time a command is received.

By the above process, the host 100 is capable of obtaining the leak monitor information of the magnetic disk device 300 from the TPTT field T11 included in the response of a command every time the first monitoring time has passed.

Figure 10:
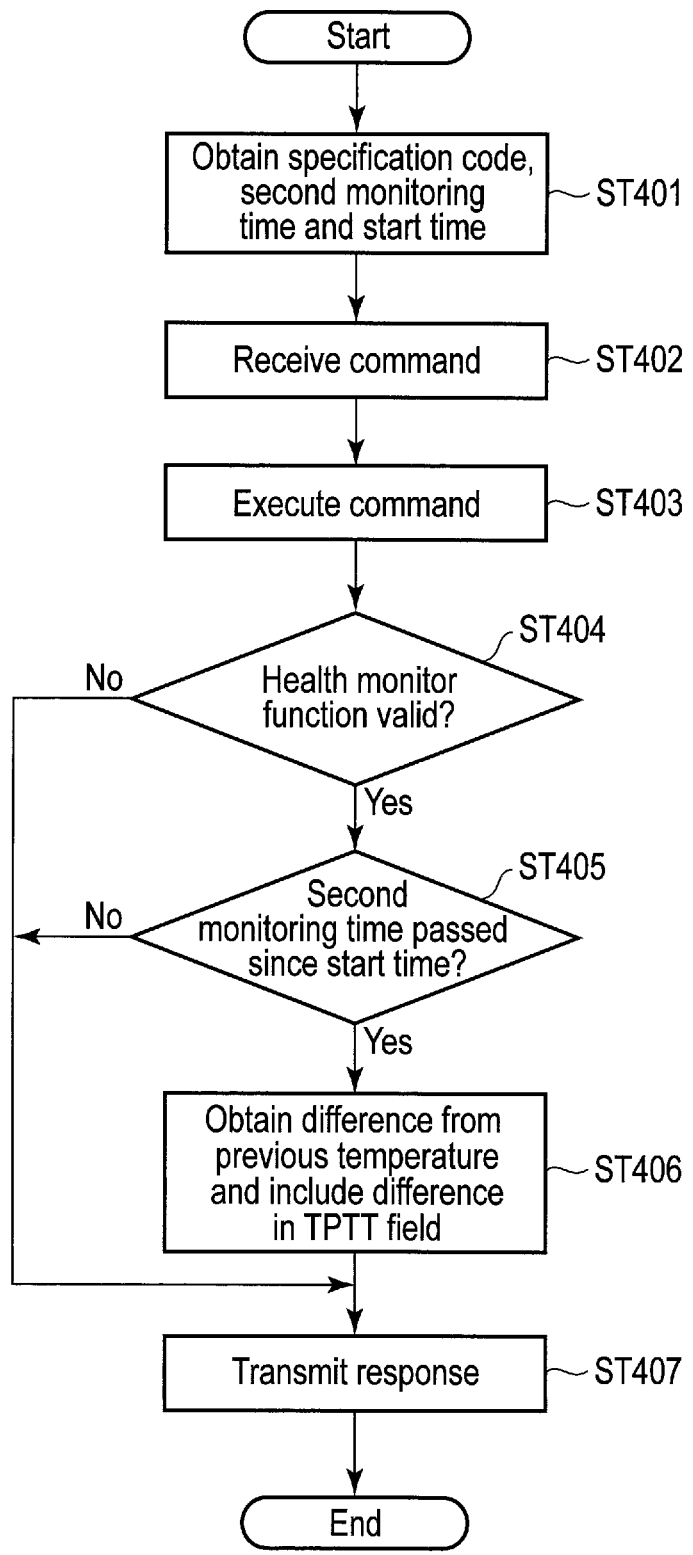
FIG. 10 is a flowchart showing an example of a process performed by the magnetic disk device according to the embodiment.

FIG. 9 and FIG. 10 show processes when the temperature (specification code 01) of the magnetic disk device 300 is set in specification code setting units 173 and 320. FIG. 9 is a flowchart showing an example of a process performed by the host 100. FIG. 10 is a flowchart showing an example of a process performed by the magnetic disk device 300. The process of FIG. 9 is realized when CPU 110 reads and runs the health monitor program 171. The process of FIG. 10 is realized when CPU 316 reads and runs the state acquisition program 321.

The process of the host 100 is explained.

As shown in FIG. 9, CPU 110 firstly sets a specification code and a second monitoring time (ST301). For example, a user operates the input unit 150 to perform this setting in a manner similar to that of FIG. 7. The user selects a specification code from the specification codes stored in specification code storage unit 172, and sets the specification code in specification code setting unit 173. Here, the user sets the temperature of the magnetic disk device 300 (specification code 01) in specification code setting unit 173, and sets the second monitoring time (for example, 30 minutes) in specification code setting unit 173 as the monitoring time. The specification code and the second monitoring time set in this way are transmitted to the magnetic disk device 300 via the expander 200. When the information is received in the magnetic disk device 300, the temperature (specification code 01) and the second monitoring time are set in specification code setting unit 320 by the mode changing unit 318.

Subsequently, CPU 110 issues a command (ST302). Thus, the command is transmitted to the magnetic disk device 300 via the expander 200. CPU 110 receives a response based on the issued command from the magnetic disk device 300 (ST303).

Subsequently, CPU 110 determines whether or not the TPTT field value of the TPTT field T11 of the response is greater than or equal to a predetermined value (ST304). Here, the predetermined value is a value set in advance and indicating the upper limit of the temperature of the magnetic disk device 300. When CPU 110 determines that the TPTT field value is greater than or equal to the predetermined value (ST304: YES), CPU 110 changes the second monitoring time to a third monitoring time (ST305). The third monitoring time is shorter than the second monitoring time. For example, when the second monitoring time is 30 minutes, the third monitoring time is 10 minutes. The information of the change to the third monitoring time is transmitted to the magnetic disk device 300. CPU 110 issues an instruction to start fan operation (ST306). CPU 110 transmits an instruction to operate the fan to the magnetic disk device 300. In this way, in the magnetic disk device 300, the operation of the fan is started, thereby decreasing the temperature. Subsequently, this process is terminated. Until the setting of the specification code and the first monitoring time is changed next, the process of step ST302 to the process of step ST306 are repeated every time a command is received.

Now, this specification explains the process of the magnetic disk device 300.

As shown in FIG. 10, CPU 316 obtains a specification code, the second monitoring time and the start time (ST401). Here, the specification code is the temperature of the magnetic disk device 300 (specification code 01). The start time is the time point at which the specification code and the second monitoring time are obtained from the host 100 and set in specification code setting unit 320.

When CPU 316 receives a command from the host 100 via the expander 200 (ST402), CPU 316 executes the command (ST403). Subsequently, CPU 316 determines whether or not the health monitor function is valid (ST404). In the present embodiment, the health monitor function is turned on. When CPU 316 determines that the health monitor function is turned on (ST404: YES), CPU 316 determines whether or not the second monitoring time has passed since the start time (ST405). When CPU 316 determines that the second monitoring time has passed (ST405: YES), CPU 316 measures the temperature of the magnetic disk device 300 in accordance with the specified specification code, sets the measurement value so as to be the bit number defined in advance and includes the measurement value in the TPTT field T11 of a response (ST406). CPU 316 transmits the response (ST407). More specifically, CPU 316 transmits a response including temperature information in the TPTT field T11 to the host 100, and terminates the process. For example, information indicating the specification code and information indicating the temperature difference from the temperature previously measured are included in the high-order byte of the TPTT field T11. Information indicating the current temperature is included in the low-order byte. When information of a change to the third monitoring time is received from the host 100, the second monitoring time is changed to the third monitoring time.

When CPU 316 determines that the health monitor function is invalid in step ST404 (ST404: NO), or when CPU 316 determines that the second monitoring time has not passed since the start time in step ST405 (ST405: NO), CPU 316 transmits a response and terminates the process (ST407). In the TPTT field T11 of the response, temperature information is not included. Until the setting of the specification code and the second monitoring time is changed next, the process of step ST402 to the process of step ST407 are repeated every time a command is received.

By the above process, the host 100 is capable of obtaining the temperature information of the magnetic disk device 300 from the TPTT field T11 included in the response of a command every time the second monitoring time has passed. When the host 100 issues an instruction to rotate the fan, the host 100 is capable of obtaining the temperature information of the magnetic disk device 300 based on the third monitoring time shorter than the second monitoring time afterward. Thus, whether or not the temperature of the magnetic disk device 300 falls below the upper limit can be confirmed at shorter intervals. When the decrease in the temperature of the magnetic disk device 300 cannot be confirmed even at the next interval, CPU 110 may suppress a process for issuing a command to the magnetic disk device 300 such that the decrease in the temperature of the magnetic disk device 300 is accelerated.

According to the host 100 and the magnetic disk device 300 configured in the above manner, the host 100 causes the state of the magnetic disk device 300 regarding the item indicated by the set specification code to be included in the TPTT field T11 of a response to a command. In this way, the I/O process cannot be affected when the state of the magnetic disk device 300 is known.

In the above embodiment, the expander 200 is used as a relay device. However, when a specification storage unit and a specification code setting unit are provided in the controller (not shown) of the expander 200 in a manner similar to that of the host 100 and the magnetic disk device 300, the expander 200 is also capable of knowing the state of the magnetic disk device 300 in a manner similar to that of the host 100.

The above embodiment assumes a case where the magnetic disk device 300 is used as a storage device (electronic device) of the electronic device system 1. However, the storage device is not limited to this example. The storage device may be any storage device as long as it performs communication by a predetermined interface, in the above embodiment, by a SAS interface. For example, the technique explained in the above embodiment may be applied to a solid state drive (SSD) comprising such an interface and a tape device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
an interface operable to perform communication in accordance with a protocol;
a setting unit configured to set one of a plurality of items indicating a state of the electronic device; and
a controller configured to, when a command is received via the interface, obtain the state of the item set in the setting unit, and when a response to the command is transmitted, include state information indicating the state of the set item in a header portion of the response defined in a communication standard of the protocol.

2. The electronic device of claim 1, wherein
the state information is information indicating the state of each set item by a corresponding bit number, and
the controller includes the information indicated by the bit number in a position of the header portion.

3. The electronic device of claim 1, wherein
the interface is a Serial Attached SCSI, and
the protocol is a Serial SCSI Protocol.

4. An electronic device system including a first electronic device, and a second electronic device which manages the first electronic device, wherein
the first electronic device comprises:
an interface operable to perform communication in accordance with a protocol;
a setting unit configured to sets one of a plurality of items indicating a state of the electronic device; and
a first controller configured to, when a command is received via the interface, obtain the state of the item set in the setting unit, and when a response to the command is transmitted, include state information indicating the state of the set item in a header portion of the response defined in a communication standard of the protocol, and
the second electronic device comprises a second controller configured to, when the state information included in the header portion of the response is received, obtain the state of the item of the first electronic device from the state information.

5. The system of claim 4, wherein
the second controller changes the item set in the setting unit of the first electronic device at a time point.

6. A magnetic disk device comprising:
an interface operable to perform communication in accordance with a protocol;
a setting unit configured to set one of a plurality of items indicating a state of the magnetic disk device; and
a controller configured to, when a command is received via the interface, obtain the state of the item set in the setting unit, and when a response to the command is transmitted, include state information indicating the state of the set item in a header portion of the response defined in a communication standard of the protocol.

7. The magnetic disk device of claim 6, further comprising:
a magnetic disk; and
a magnetic head which reads/writes data with respect to the magnetic disk, wherein
one of the items indicating the state of the magnetic disk device is helium leak monitor information indicating a helium leak state of the magnetic disk device.

8. The magnetic disk device of claim 6, wherein
one of the items indicating the state of the magnetic disk device is a temperature of a hard disk drive of the magnetic disk device.

9. The magnetic disk device of claim 6, further comprising:
a magnetic disk; and
a magnetic head which reads/writes data with respect to the magnetic disk, wherein
one of the items indicating the state of the magnetic disk device is voltage in a track supplied by the magnetic disk device to the magnetic head at the time of reading or writing.

10. The electronic device of claim 2, wherein
the interface is a Serial Attached SCSI, and
the protocol is a Serial SCSI Protocol.

* * * * *